United States Patent
Nishimura et al.

(10) Patent No.: US 7,898,460 B2
(45) Date of Patent: Mar. 1, 2011

(54) RADAR TARGET DETECTING METHOD, AND APPARATUS USING THE TARGET DETECTING METHOD

(75) Inventors: Tetsu Nishimura, Toyonaka (JP); Toru Ishii, Hirakata (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/365,365

(22) Filed: Feb. 4, 2009

(65) Prior Publication Data

US 2009/0231182 A1    Sep. 17, 2009

Related U.S. Application Data

(63) Continuation of application No. PCT/JP2007/063715, filed on Jul. 10, 2007.

(30) Foreign Application Priority Data

Aug. 4, 2006   (JP) ................................ 2006-213448

(51) Int. Cl.
   *G01S 7/35*    (2006.01)
   *G01S 7/02*    (2006.01)
   *G01S 13/536*  (2006.01)
   *G01S 13/93*   (2006.01)

(52) U.S. Cl. ................. 342/27; 342/28; 342/70; 342/73; 342/74; 342/82; 342/89; 342/118; 342/127; 342/128; 342/146; 342/147; 342/175; 342/195; 342/196

(58) Field of Classification Search .............. 342/27, 342/28, 70–72, 104–118, 127–133, 146, 342/147, 175, 192–197, 155–158, 165, 173, 174, 73–103; 701/300, 301; 180/167–169
See application file for complete search history.

(56) References Cited

U.S. PATENT DOCUMENTS

| 5,008,678 | A | * | 4/1991 | Herman | 342/158 |
| 5,369,409 | A | * | 11/1994 | Urabe et al. | 342/133 |
| 5,486,832 | A | * | 1/1996 | Hulderman | 342/70 |
| 5,579,010 | A | * | 11/1996 | Iihoshi et al. | 342/70 |

(Continued)

FOREIGN PATENT DOCUMENTS

EP    0919828 A2    6/1999

(Continued)

OTHER PUBLICATIONS

PCT/JP2007/063715 International Search Report dated Jul. 27, 2007.

(Continued)

*Primary Examiner* — Bernarr E Gregory
(74) *Attorney, Agent, or Firm* — Dickstein Shapiro LLP

(57) ABSTRACT

A radar apparatus includes a transmitting antenna and a receiving antenna that has a plurality of antenna elements, and switches the plurality of antenna elements in synchronization with a modulation period to acquire receiving signals. At this time, the antenna elements are switched in accordance with a combination of a first sub-phase and a second sub-phase in which the antenna elements are sequentially switched in opposite directions to thereby acquire the receiving signals. The radar apparatus calculates an azimuth sine value $\sin\theta_1$ from the acquired receiving signals of the first sub-phase and calculates an azimuth sine value $\sin\theta_2$ from the receiving signals of the second sub-phase. Next, the radar apparatus calculates an actual azimuth $\theta$ through an averaging process of these azimuth sine values $\sin\theta_1$ and $\sin\theta_2$.

24 Claims, 11 Drawing Sheets

U.S. PATENT DOCUMENTS

| | | | |
|---|---|---|---|
| 5,717,399 A * | 2/1998 | Urabe et al. | 342/70 |
| 5,734,344 A * | 3/1998 | Yamada | 342/72 |
| 6,031,483 A * | 2/2000 | Urabe et al. | 342/70 |
| 6,147,638 A * | 11/2000 | Rohling et al. | 342/109 |
| 6,246,359 B1 * | 6/2001 | Asano et al. | 342/158 |
| 6,292,129 B1 | 9/2001 | Matsugatani et al. | |
| 6,573,859 B2 * | 6/2003 | Tokoro | 342/70 |
| 6,646,589 B2 * | 11/2003 | Natsume | 342/70 |
| 6,856,277 B2 * | 2/2005 | Katayama et al. | 342/70 |
| 7,151,482 B2 * | 12/2006 | Natsume et al. | 342/147 |
| 7,301,496 B2 * | 11/2007 | Honda et al. | 342/70 |
| 7,495,603 B2 * | 2/2009 | Honda et al. | 342/70 |
| 7,504,990 B2 * | 3/2009 | Isaji | 342/109 |
| 2001/0015698 A1 * | 8/2001 | Tokoro | 342/70 |
| 2004/0145513 A1 * | 7/2004 | Katayama et al. | 342/70 |
| 2006/0028375 A1 * | 2/2006 | Honda et al. | 342/70 |
| 2006/0055589 A1 * | 3/2006 | Honda et al. | 342/70 |
| 2006/0132353 A1 | 6/2006 | Natsume et al. | |

FOREIGN PATENT DOCUMENTS

| | | |
|---|---|---|
| JP | 04-343084 | 11/1992 |
| JP | 2000-284047 | 10/2000 |
| JP | 2003-315447 | 11/2003 |
| JP | 2004-170371 | 6/2004 |
| JP | 2005-257384 | 9/2005 |
| JP | 2005-257523 | 9/2005 |

OTHER PUBLICATIONS

PCT/JP2007/063715 Written Opinion dated Jul. 27, 2007.

* cited by examiner

RADAR TARGET DETECTING METHOD, AND APPARATUS USING THE TARGET DETECTING METHOD

CROSS REFERENCE TO RELATED APPLICATIONS

The present application is a continuation of International Application No. PCT/JP2007/063715, filed Jul. 10, 2007, which claims priority to Japanese Patent Application No. JP2006-213448, filed Aug. 4, 2006, the entire contents of each of these applications being incorporated herein by reference in their entirety.

FIELD OF THE INVENTION

The invention relates to a radar target detecting method and, more particularly, to a target azimuth detecting method and a radar apparatus that uses the detecting method.

BACKGROUND OF THE INVENTION

Various existing radar apparatuses have been created. Each radar apparatus is provided at the front, or the like, of an automobile, transmits a transmission wave to a predetermined detecting area including the front area of the automobile, and then receives a wave reflected from a target inside the detecting area, thus detecting the target. Then, in an automotive field, an FMCW radar apparatus is used as the above radar apparatus.

The FMCW radar apparatus generates an IF beat signal by multiplying a transmission signal based on a transmission wave by a reception signal that includes a reflected wave and then detects a target through a complex frequency spectrum of the IF beat signal. At this time, the FMCW radar apparatus applies a known direction of arrival estimation algorithm, such as a beamformer method, to the acquired complex frequency spectrum to thereby estimate the azimuth of the target detected.

However, when the desired target has a relative velocity with respect to a host vehicle (host apparatus), the estimated azimuth includes an error due to the relative velocity. As a solution for this problem, a radar apparatus described in Patent Document 1 separately calculates a relative velocity and then corrects the estimated azimuth on the basis of the calculated relative velocity.

[Patent Document 1] Japanese Patent No. 3575694

However, with the method described in Patent Document 1, when a highly accurate azimuth is intended to be detected, the relative velocity also needs to be accurately detected.

Here, for example, when the frequency of the transmission wave is 76.5 GHz, the time interval at which a plurality of receiving antennas are switched is 1 ms, and the relative velocity of the desired target is 1 km/h, a variation in distance from the target to the receiving antenna between the adjacent receiving antennas due to the relative velocity is about $0.14\lambda$ where the wavelength of transmission and reception waves is $\lambda$. Here, when the interval between the receiving antennas is $0.9\lambda$, an azimuth error caused by the relative velocity is about 9°.

Thus, even when the relative velocity is just 1 km/h, the phase difference of about 9° occurs. Therefore, to calculate a highly accurate azimuth, a relative velocity further more precise than 1 km/h needs to be calculated. Hence, it is considerably difficult to calculate a highly accurate azimuth with a method of correcting the azimuth using a relative velocity as described in Patent Document 1.

SUMMARY OF THE INVENTION

It is an object of the invention to provide a target detecting method for a radar apparatus, which is able to highly accurately detect the azimuth of a target without calculating the relative velocity of the target, and a radar apparatus that detects a target using the method.

The invention relates a radar target detecting method in which any one or both of a transmitting antenna and a receiving antenna is formed of a plurality of antenna elements arranged in a straight line, the plurality of antenna elements arranged in the straight line are switched in synchronization with a modulation period of a transmission signal to detect a target using acquired receiving signals, and a radar that uses the method. The invention has the feature described below.

The plurality of antenna elements are switched so that the total of phase differences generated among the antennas due to a relative velocity of the target at the time when one switching pattern is executed is substantially zero.

In the case of the above radar, any one or both of the transmitting antenna and the receiving antenna are formed of a plurality of antenna elements arranged in a straight line, and target detection is performed while switching the antenna elements for transmission and/or reception. Specifically, when a transmission and reception system includes a transmission antenna formed of a single antenna element and a receiving antenna formed of a plurality of antenna elements arranged in a straight line, the antenna elements of the receiving antenna, which are controlled for switching, sequentially receive a reflected wave based on a transmission wave from the transmitting antenna to generate a receiving signal. In addition, when a transmission and reception system includes a transmitting antenna formed of a plurality of antenna elements arranged in a straight line and a receiving antenna formed of a single antenna element, the antenna elements of the transmitting antenna, which are controlled for switching, sequentially transmit a transmission wave and then the receiving antenna receives a reflected wave based on each transmission wave to generate a receiving signal. Furthermore, when a transmission and reception system includes a transmitting antenna and a receiving antenna, both of which are formed of a plurality of antenna elements arranged in a straight line, the antenna elements of the transmitting antenna, which are controlled for switching, sequentially transmit a transmission wave and then the other antenna elements of the receiving antenna, which are controlled for switching, sequentially receive a reflected wave to generate a receiving signal for each combination of the antenna element of the transmitting antenna and the antenna element of the receiving antenna.

When a receiving signal is acquired through the above switching control, a distance between a target and a host apparatus varies in accordance with a relative velocity of the target to the host apparatus and a switching timing of the antennas. Thus, in accordance with this, the phase of the receiving signal varies.

For this reason, in the method described in (1), the plurality of antenna elements arranged in the straight line are switched so that, at the time when one-pattern switching control is complete, a phase difference based on the relative velocity caused by switching during the one pattern is substantially zero. Thus, a phase difference based on the relative velocity is eliminated, and only the phase difference based on the positional relationship between each antenna element and the target remains. Hence, the azimuth is highly accurately estimated through a beamforming method, or the like.

The switching pattern includes a first sub-pattern and a second sub-pattern. In addition, a deviation in phase due to the relative velocity of the target, developed by switching of the first sub-pattern, and a deviation in phase due to the relative velocity of the target, developed by switching of the second sub-pattern, are in opposite phases and are substantially equal in magnitude.

With the above method and the configuration implementing the above method, the deviations in phase due to the relative velocity are in opposite phases and substantially equal in magnitude between the first sub-pattern and the second sub-pattern that form the switching pattern. Thus, a phase difference due to the relative velocity in each switching pattern is substantially zero.

In addition, the invention switches the antenna elements so that a pattern of switching in a first direction along the straight line in which the plurality of antenna elements are arranged is set as the first sub-pattern and a pattern of switching in a second direction opposite to the first direction as the second sub-pattern, and the number of switchings in the first sub-pattern and distances between the antenna elements caused by the switchings are equal to the number of switchings in the second sub-pattern and distances between the antenna elements caused by the switchings.

With the above method and the configuration implementing the above method, as a specific method for setting the above described phase difference to substantially zero, the antenna elements are switched so that the number of switchings in two opposite directions parallel to a direction in which the antenna elements are arranged and distances caused by the switchings in the respective directions are equal.

A phase difference based on the positional relationship between the target and the antenna elements, that is, a phase difference based on an actual azimuth, is uniquely determined on the basis of the positional relationship between the target and the antenna elements. On the other hand, a phase difference based on the relative velocity is uniquely determined in accordance with the switching timing.

For example, when, as viewed from the front, the antenna elements are switched from the right end to the left end as a first direction, and the antenna elements are switched from the left end to the right end as a second direction, a variation in phase difference due to the positional relationship is not dependent on the switching direction. On the other hand, a variation in phase difference due to the relative velocity depends on a time interval and, therefore, a phase difference increases in opposite directions depending on the switching direction. That is, when switched in the first direction, the phase difference due to the relative velocity sequentially increases from the right-end antenna element to the left-end antenna element, while when switched in the second direction, the phase difference due to the relative velocity sequentially increases from the left-end antenna element to the right-end antenna element. Then, these phase differences depend on a switching interval derived from the switching timing. Utilizing the fact that the phase differences due to the relative velocity are opposite characteristics between the opposite two switching directions, the antenna elements are switched in these two directions so that the number of switchings in the respective directions and distances caused by the switchings are equal. Thus, the phase difference due to the relative velocity is cancelled as a whole and become substantially zero.

The invention calculates the azimuth of the target on the basis of a first azimuth that is estimated from an IF beat signal obtained through switching in the first direction and a second azimuth that is estimated from an IF beat signal obtained through switching in the second direction.

With the above method and the configuration implementing the above method, utilizing the above described characteristic, the azimuth of the target is calculated on the basis of the first azimuth obtained through switching in the first direction and the second azimuth obtained through switching in the second direction. That is, the actual azimuth is obtained through calculation with a combination of the first azimuth and the second azimuth so that the influence of the phase difference due to the relative velocity is cancelled.

Where the sine of the first azimuth is $\sin \theta_1$, the sine of the second azimuth is $\sin \theta_2$, and the sine of the azimuth of the target is $\sin \theta$, the azimuth of the target is calculated using the following arithmetic expression $$\sin \theta = (\sin \theta_1 + \sin \theta_2)/2 \qquad \text{(Expression 1)}$$

With the above method and the configuration implementing the above method, the azimuth of the target is calculated using (Expression 1). (Expression 1) adds the sine of the first azimuth and the sine of the second azimuth and then multiplies by ½. Thus, the phase differences due to the relative velocity included in the respective azimuths in opposite characteristics are cancelled. By so doing, without any influence of the phase difference due to the relative velocity, an accurate azimuth is obtained.

The interval d at which the plurality of antenna elements are arranged in the straight line is set to be larger than or equal to $0.5\lambda$ with respect to the wavelength $\lambda$ of transmission and reception signals.

With the above method and the configuration implementing the above method, by setting the interval d of the antenna elements to be larger than or equal to $0.5\lambda$, at least one spectrum peak estimated using an azimuth estimation algorithm, such as a beamforming method, definitely appears irrespectively of the relative velocity. Thus, the first azimuth and the second azimuth may be reliably obtained and, therefore, the azimuth of the target is reliably obtained.

When an interval d at which the plurality of antenna elements are arranged in the straight line is set to be smaller than $0.5\lambda$ with respect to the wavelength $\lambda$ of transmission and reception signals, an interval of the antenna elements is virtually set to be larger than or equal to $0.5\lambda$ at the time of calculating an azimuth of the target, and the azimuth calculated on the basis of the above condition is corrected to an azimuth corresponding to the setting in which the interval is smaller than $0.5\lambda$.

With the above method and the configuration implementing the above method, when the interval d of the antenna elements is smaller than $0.5\lambda$, it is impossible to apply the case in which the interval is larger than or equal to $0.5\lambda$ shown in the above (5). Thus, at the time of calculating the azimuth, the azimuth is calculated using the above described method by virtually setting the antenna element interval d to $0.5\lambda$. However, the thus calculated azimuth differs from the actual azimuth of the target, so the calculated azimuth is corrected using the relationship between the set value of the antenna element interval d at the time of the azimuth calculation and the actual antenna element interval d. For example, when the set value of the antenna element interval d is twice the actual antenna element interval d, a value obtained by multiplying the calculated azimuth by ½ is output as the actual azimuth of the target.

Where a front direction of the radar apparatus is 0°, a detecting azimuth angle range is set within a range from $\theta\min$ to $\theta\max$, the range of $\theta\min$ to $\theta\max$ is set within a range of $-90°$ to $+90°$, an interval at which the plurality of antenna elements are arranged in the straight line is d, and the wavelength of transmission and reception signals is λ, the plurality of antenna elements are arranged in the straight line so as to satisfy the following expression.

$$d < (1/(\sin\theta_{max} - \sin\theta_{min})) \cdot (\lambda/2) \quad \text{(Expression 2)}$$

With the above method and the configuration implementing the above method, even when a plurality of spectrum peaks appear in at least any one of the directions and then a plurality of azimuths of the target are calculated, by using the antenna interval d that limits the detecting azimuth angle range as described above, only one azimuth is included within the detecting azimuth angle range and, therefore, it is possible to accurately calculate the azimuth of the target.

Where a front direction of the radar apparatus is 0°, a calculating azimuth angle range is set within a range from −θcal to θcal including 0°, an interval at which the plurality of antenna elements are arranged in the straight line is d, and the wavelength of transmission and reception signals is λ, an azimuth of the target is calculated within the calculating azimuth angle range set by the following expression $$\theta_{cal} = \sin^{-1}(\lambda/2d) \quad \text{(Expression 3)}$$

With the above method and the configuration implementing the above method, by limiting the calculating azimuth angle range with the above described condition, the spectrum peak is detected one for each in the first direction and in the second direction. Thus, the azimuth of the target is determined on the basis of a pair of the first azimuth and the second azimuth. At this time, the calculated azimuth may be not present within the detecting range; however, a plurality of spectra are present within the detecting azimuth angle range, and the calculated azimuth appears at an azimuth interval of λ/(2d) with a combination of these spectra. Thus, by adding or subtracting λ/(2d) to or from the calculated azimuth, it is possible to calculate the azimuth within the detecting azimuth angle range. Then, the azimuth that falls within the detecting azimuth angle range is determined as the azimuth of the target. In this method, because the azimuth angle estimation range is limited by θcal, an operation load for azimuth detection is reduced.

The plurality of antenna elements arranged in the straight line are set at unequal intervals, and an interval, which is the greatest common divisor of the unequal intervals, coincides with the interval d. With the above method and the configuration implementing the above method, by arranging the antenna elements at unequal intervals, the interval between both ends of the arranged antenna elements increases and, therefore, the azimuth resolution improves. Thus, the spectrum peaks are steep, and the first azimuth and the second azimuth are further accurately detected. As a result, the azimuth of the target is further accurately calculated.

A switching interval of the plurality of antenna elements arranged at the unequal intervals is set on the basis of a distance between the plurality of antenna elements.

With the above method and the configuration implementing the above method, because a variation in phase difference due to the relative velocity in accordance with each antenna interval is obtained, the first azimuth and the second azimuth are further accurately detected and, therefore, the azimuth of the target is further accurately calculated.

When a plurality of the first azimuths and a plurality of the second azimuths are respectively obtained, the azimuth is calculated so that a spectrum intensity of each of the first azimuths is compared with a spectrum intensity of each of the second azimuths and then the azimuths having an equal spectrum intensity are combined.

With the above method and the configuration implementing the above method, even when a plurality of spectrum peaks are present, the first azimuth and the second azimuth are associated with each other on the basis of a spectrum intensity. Thus, it is possible to calculate the azimuths of a plurality of targets at the same time.

According to the invention, because there is no influence caused by a phase difference due to a relative velocity, it is possible to highly accurately detect the azimuth of a target without calculating the relative velocity.

In addition, according to the invention, by appropriately setting an antenna interval and a detecting azimuth angle range, it is possible to further accurately and reliably detect the azimuth of a target.

In addition, according to the invention, by appropriately setting a calculating azimuth angle range, it is possible to reduce an operation load on azimuth detection.

In addition, according to the invention, by setting an antenna interval at unequal intervals, it is possible to further accurately detect the azimuth of a target.

In addition, according to the invention, it is possible to detect the azimuths of a plurality of targets at the same time.

Figure 1:
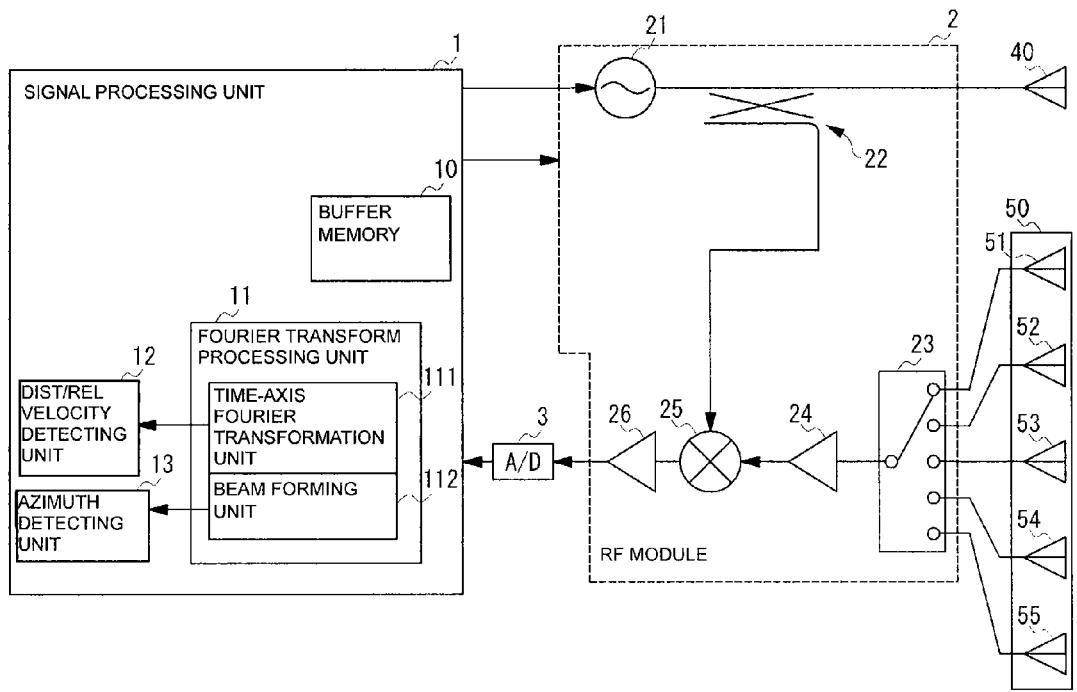
FIG. 1 is a block diagram that shows a schematic configuration of an FMCW radar apparatus according to a first embodiment.

REFERENCE NUMERALS signal processing unit
buffer memory
Fourier transform processing unit
time-axis Fourier transformation unit
beamforming unit
distance and relative velocity detecting unit
azimuth detecting unit
RF module
VCO
distributor
output switching unit
RF amplifier
mixer
IF amplifier
A/D converter
transmitting antenna
receiving antenna
51 to 55 antenna element

DETAILED DESCRIPTION OF THE INVENTION

A radar apparatus and a target detecting method for the radar apparatus according to a first embodiment of the invention will be described with reference to the accompanying drawings. Note that in the present embodiment, an FMCW radar apparatus that includes a transmitting antenna formed of a single antenna element and a receiving antenna formed of a plurality of antenna elements will be described as an example.

Figure 2:
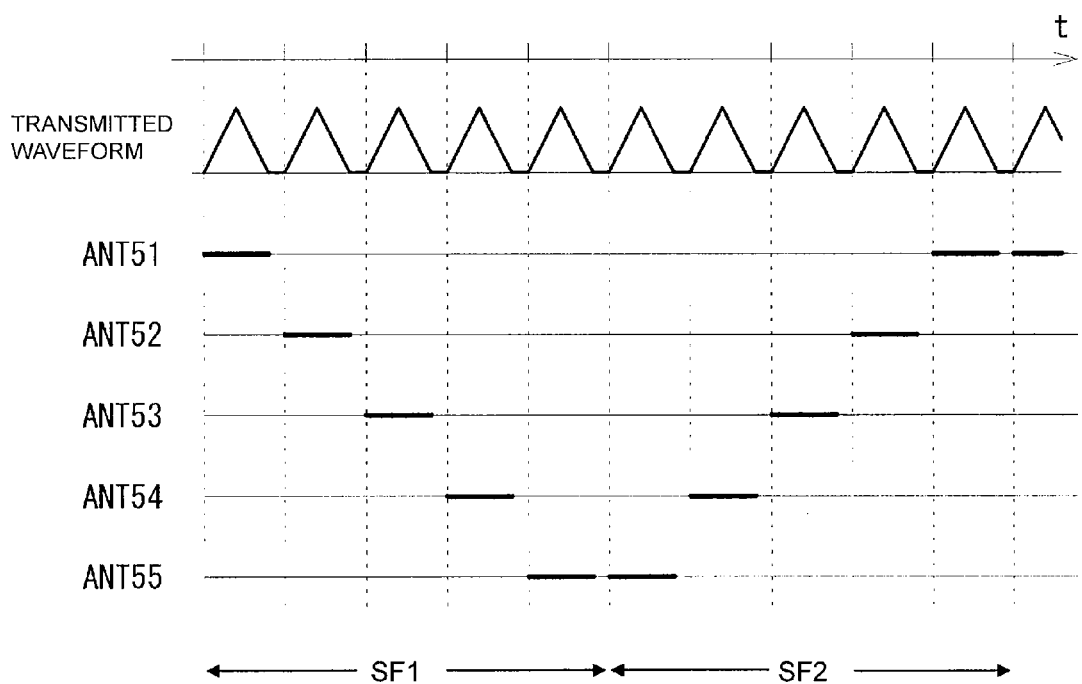
FIG. 2 is a view that illustrates a state of synchronization between a transmission control and a switching control in the first embodiment.

FIG. 1 is a block diagram that shows a schematic configuration of the FMCW radar apparatus according to the present embodiment. FIG. 2 is a view that illustrates a state of synchronization between a transmission control and a switching control. As shown in FIG. 1, the radar apparatus of the present embodiment includes a signal processing unit 1, an RF module 2, a transmitting antenna 40, and a receiving antenna 50. The signal processing unit 1 executes a transmission signal control, a switching control and object detection.

The signal processing unit 1 generates a transmission control signal and a switching control signal as a transmission system control. The transmission control signal is a signal that is supplied to a VCO 21 of the RF module 2 in order to generate a transmission signal that is obtained by modulating the frequency into a triangle shape in time sequence (hereinafter, simply referred to as "triangular wave modulation transmission signal"). In addition, the switching control signal is a signal that is supplied to an output switching circuit 23 of the RF module 2 in order to select antenna elements 51 to 55 of the receiving antenna 50.

Here, as shown in FIG. 2, the triangular wave modulation transmission signal is formed of triangular wave modulation sections in which the frequency is modulated into a triangular wave and non-modulation sections in between the triangular wave modulation sections.

The signal processing unit 1 outputs the transmission control signal so that the triangular wave modulation sections are generated at predetermined transmission periods ΔT. At the same time, the signal processing unit 1 outputs the switching control signal that coincides the rising timing of each triangular wave modulation section with the switching timing of the antenna elements 51 to 55 so that the antenna elements 51 to 55 sequentially correspond to the triangular wave modulation sections. At this time, the switching pattern of the antenna elements 51 to 55 is predetermined, and, for example, the switching pattern repeats a main phase formed of a first sub-phase SF1 and a second sub-phase continuously. As shown in FIG. 2, in time sequence, in the first sub-phase SF1, the antenna elements are switched in the order of the antenna element 51, the antenna element 52, the antenna element 53, the antenna element 54, and the antenna element 55, and in the second sub-phase SF2, the antenna elements are switched in the order of the antenna element 55, the antenna element 54, the antenna element 53, the antenna element 52 and the antenna element 51. Note that the switching pattern of the antenna elements is not limited to the above; it may employ switching patterns in which main phases of various patterns described in the end of the embodiments in the specification are repeated. Then, the details will be described later; the pattern of the main phase is set so that a phase difference due to a relative velocity in receiving signals received during the main phase becomes substantially zero.

The RF module 2 includes the VCO 21 and a distributor 22 as a transmission system circuit, and an output switching unit 23, an RF amplifier 24, a mixer 25 and an IF amplifier 26 as a reception system circuit.

As the transmission system of the RF module 2, the VCO 21 is a so-called voltage-controlled oscillator. The VCO 21 receives the transmission control signal from the signal processing unit 1 to generate a triangular wave modulation transmission signal, and outputs the triangular wave modulation transmission signal to the distributor 22.

The distributor 22 is a directional coupler. The distributor 22 supplies the triangular wave modulation transmission signal from the VCO 21 to the transmitting antenna 40, and also generates a local signal, which is obtained by distributing the triangular wave modulation transmission signal in electric power, and supplies the local signal to the mixer 25.

The transmitting antenna 40 is formed of a single patch antenna, or the like. The transmitting antenna 40 radiates a transmission wave, for which the triangular wave modulation transmission signal is converted into radio waves, into a detecting area.

The receiving antenna 50 includes the antenna elements 51 to 55. The antenna elements 51 to 55 are patch antennas, or the like, and are, for example, a plurality of patch electrodes that are arranged at equal intervals in a line in a dielectric substrate form. The antenna elements 51 to 55 are arranged in a direction perpendicular to a front direction of the radar apparatus (front direction of an automobile equipped with the radar apparatus) and in a horizontal direction. Then, in the present embodiment, a more specific positional relationship is such that the antenna elements 51, 52, 53, 54 and 55 are sequentially arranged from the right end toward the left end as viewed from the front side of the radar apparatus.

Each of the antenna elements 51 to 55 of the receiving antenna 50 receives a reflected wave, or the like, of a target based on a transmission wave and generates a receiving signal, and then outputs the receiving signal to the output switching unit 23 of the RF module 2.

As the receiving system of the RF module 2, the output switching unit 23 receives the receiving signal from each of the antenna elements 51 to 55. The output switching unit 23 is supplied with the above described switching control signal, and the output switching unit 23 switches connection of the RF amplifier 24 with any one of the antenna elements 51 to 55 on the basis of the switching control signal. That is, the receiving signal of the antenna element selected by the switching control signal is supplied to the RF amplifier 24. At this time, switching of the antenna elements is performed in accordance with the transmission period ΔT, and the receiving signal of the antenna element that is selected for output in each triangular wave modulation section is supplied to the RF amplifier 24.

The RF amplifier 24 executes a gain control on the supplied receiving signal and outputs an RF signal, on which the gain control has been executed, to the mixer 25.

The mixer 25 generates an IF beat signal by multiplying the RF signal by the local signal and supplies the IF beat signal to the IF amplifier 26. The IF amplifier 26 executes a gain control on the IF beat signal, and outputs the resultant IF beat signal to the A/D converter 3.

The A/D converter 3 samples the amplified (gain controlled) IF beat signal at a predetermined sampling period to thereby convert an analog IF beat signal into a digital IF beat signal, and then outputs the digital IF beat signal to the signal processing unit 1.

The buffer memory 10, which is a reception system of the signal processing unit 1, sequentially buffers the input IF beat signals.

The Fourier transform processing unit 11 includes a time-axis Fourier transformation unit 111 and a beamforming unit 112. The time-axis Fourier transformation unit 111 generates a frequency spectrum using a known FFT process, and supplies the frequency spectrum to the distance and relative velocity detecting unit 12. The beamforming unit 112 applies a known beamformer method or Capon method to the frequency spectrum generated by the time-axis Fourier transformation unit to generate an azimuthal direction spectrum, and then supplies the azimuthal direction spectrum to the azimuth detecting unit 13.

The distance and relative velocity detecting unit 12 calculates a distance from the host apparatus to the detecting target and a relative velocity of the detecting target to the host apparatus using a known FMCW distance and relative velocity method.

The azimuth detecting unit 13 calculates the azimuth of the target in a method, which will be described later, on the basis of the azimuthal direction spectrum supplied from the beamforming unit 112.

Description of Principle of Azimuth Detection

The above described radar apparatus detects the azimuth of a target on the basis of the following principle.

Figure 3:
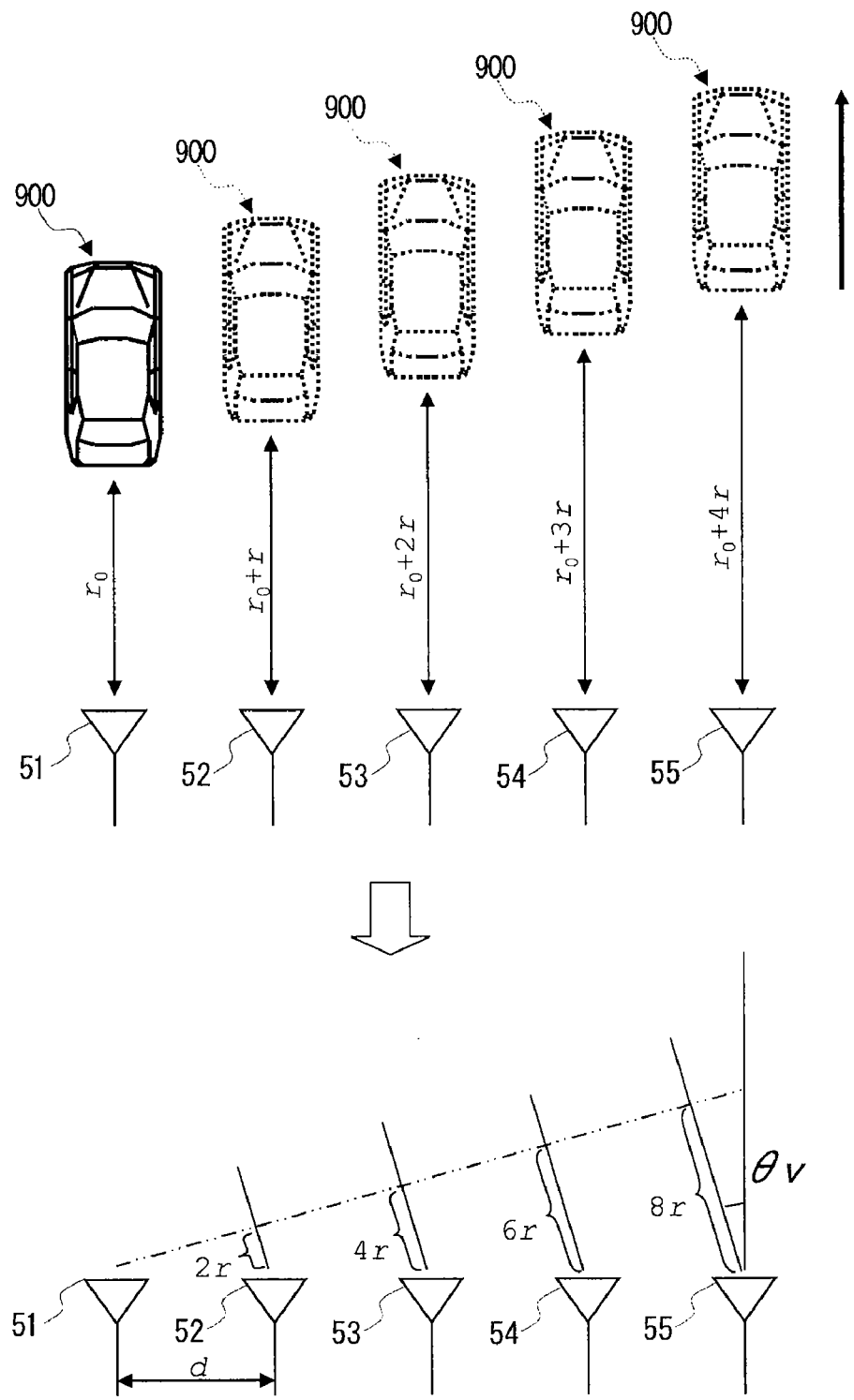
FIG. 3 is a view that shows a variation in phase due to a relative velocity.
Figure 4:
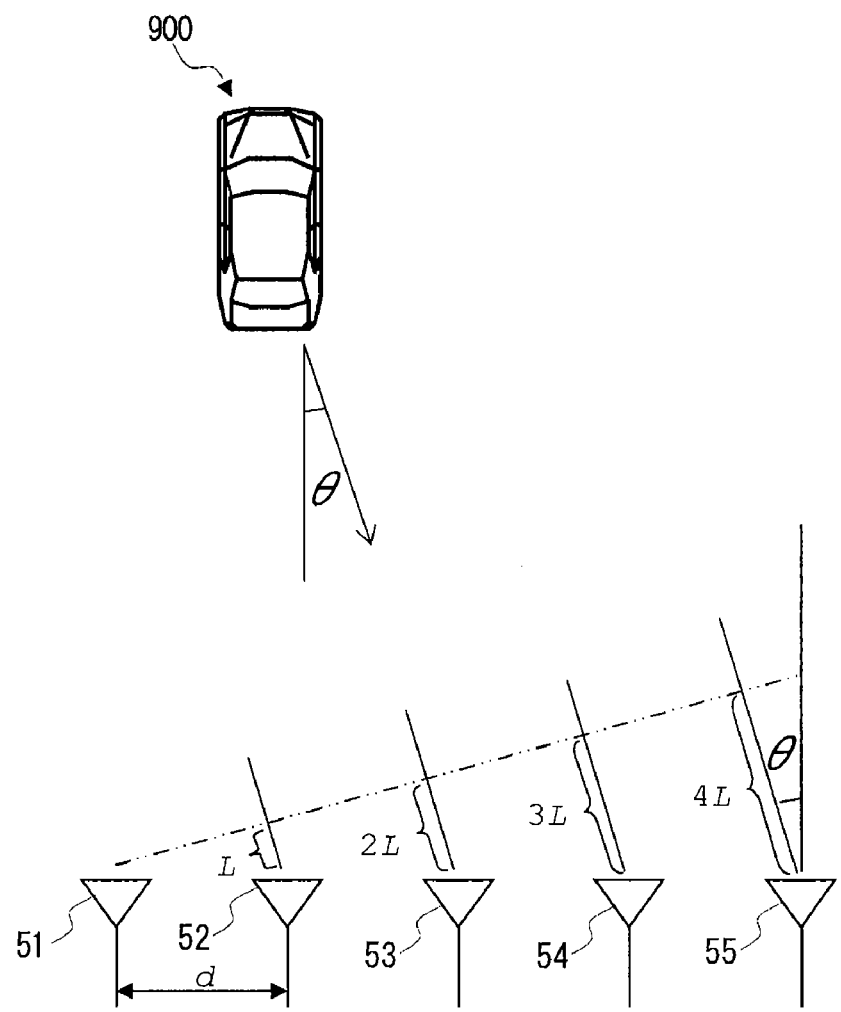
FIG. 4 is a view that shows a positional (azimuthal) relationship between a target and each antenna element, that is, an actual variation in phase due to the azimuth of the target.

FIG. 3 to FIG. 6 are views for illustrating the principle of target azimuth detection. FIG. 3 shows variations in distance to the target due to a relative velocity. FIG. 4 shows a positional (azimuthal) relationship between the target and each antenna element, that is, a distance difference between the target and each antenna element due to an actual target azimuth. FIGS. 5(A) and 5(B) are views that show variations in distance due to a relative velocity in the above described main phase. FIG. 5(A) shows variations in distance due to a relative velocity in the first sub-phase SF1. FIG. 5(B) shows variations in distance due to a relative velocity in the second sub-phase SF2.

Figure 6A:
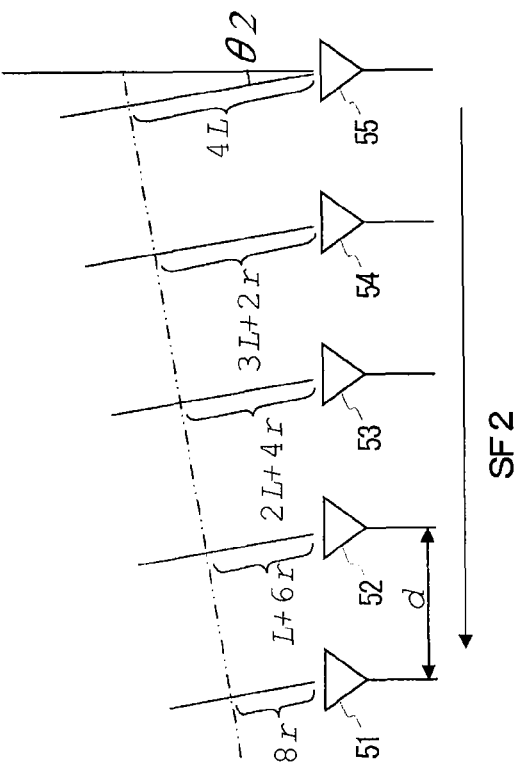
FIGS. 6(A) and 6(B) are views that show variations in phase due to a positional relationship in the main phase.
Figure 6B:
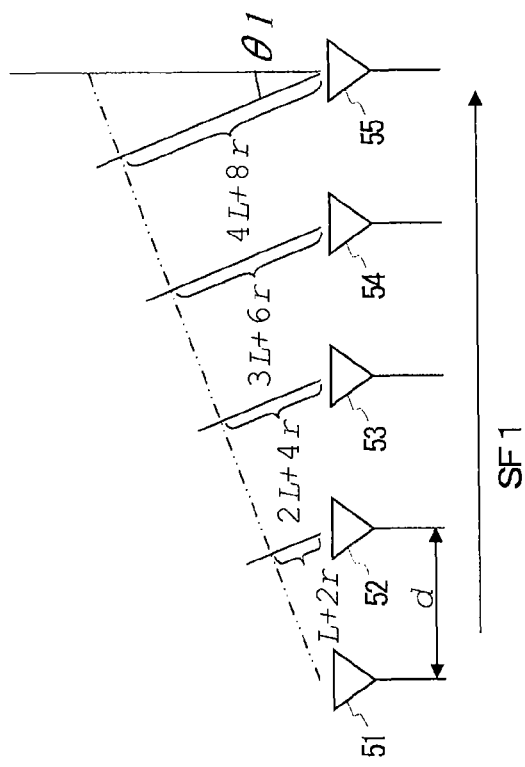

FIGS. 6(A) and 6(B) are views that show a distance difference to the target among the antenna elements due to the positional relationship in the above described main phase. FIG. 6(A) shows a distance difference to the target among the antenna elements due to the positional relationship in the first sub-phase SF1. FIG. 6(B) shows a distance difference to the target among the antenna elements due to the positional relationship in the second sub-phase SF2.

In FIG. 3, $r_0$ denotes a distance between a target 900 and the antenna element 51 at the time when the receiving signal of the antenna element 51 is selected for output, and r denotes a variation in distance due to a relative velocity in accordance with an antenna switching period.

As shown in FIG. 3, when the target 900 performs uniform linear motion at a speed of not zero relative to the host apparatus, in the first sub-phase SF1, where the distance of the antenna element 51 at the time of selection is $r_0$, the distance of the antenna element 52 at the time of selection is $r_0+r$, the phase of the antenna element 53 at the time of selection is $r_0+2r$, the distance of the antenna element 54 at the time of selection is $r_0+3r$, and the distance of the antenna element 55 at the time of selection is $r_0+4r$. Thus, where the front direction of the receiving antenna 50 is set to 0, the azimuth angle due to the relative velocity is $\theta_v$, and the antenna element interval is d, this is equivalent to that the equiphase wave surface is generated in a direction of $\theta_v = \sin^{-1}(2r/d)$. This corresponds to a deviation in azimuth angle due to the relative velocity in the first sub-phase SF1.

Figure 5A:
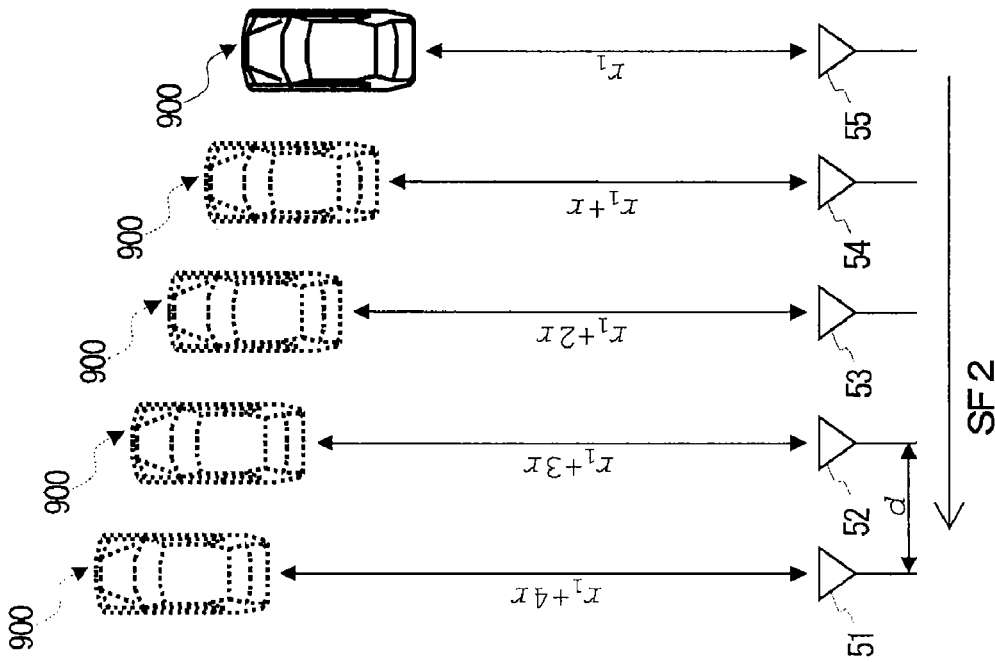
FIGS. 5(A) and 5(B) are views that show a variation in phase due to a relative velocity in a main phase.
Figure 5B:
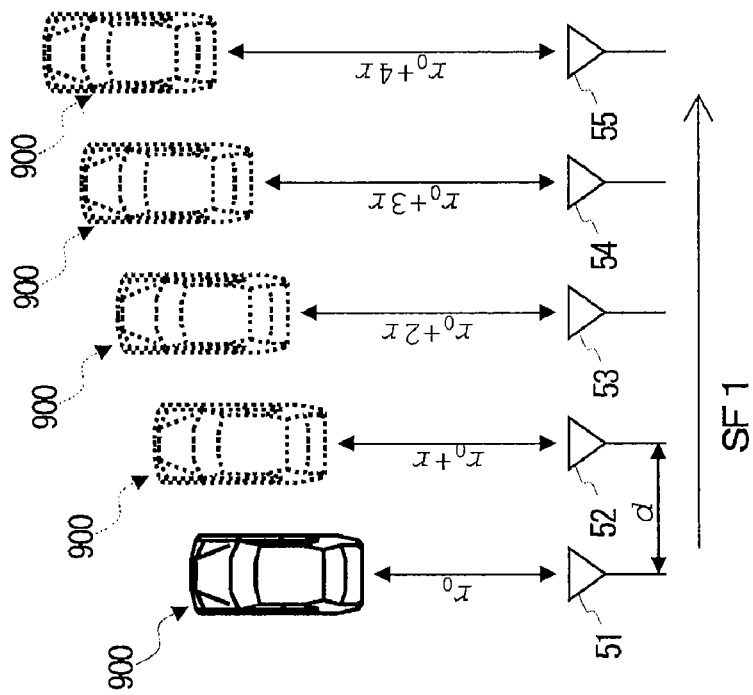

Under the above situation, when receiving signals based on reflected waves from the target are acquired by switching the antenna elements 51 to 55 in the main phase, the phase relationship shown in FIGS. 5(A) and 5(B) is obtained due to the relative velocity. That is, the distance relationship in the first sub-phase SF1 is the same as that of FIG. 3, and in the second sub-phase SF2, where the distance of the antenna element 55 at the time of selection is $r_1$, the distance of the antenna element 54 at the time of selection is $r_1+r$, the distance of the antenna element 53 at the time of selection is $r_1+2r$, the distance of the antenna element 52 at the time of selection is $r_1+3r$, and the distance of the antenna element 51 at the time of selection is $r_1+4r$. Thus, in the second sub-phase SF2, it is equivalent to that the equiphase wave surface is generated in an azimuth angle $(-\theta_v)$ of an opposite characteristic (direction that is in axial symmetry with respect to the front direction) against the azimuth angle $\theta_v$ due to the relative velocity in the first sub-phase SF1. That is, the azimuth angles having the same magnitude and opposite characteristics appear in the first sub-phase SF1 and in the second sub-phase SF2.

However, as shown in FIGS. 5(A) and 5(B), when the target 900 has a relative velocity of "0" with respect to the host apparatus, where a distance difference to the target between the adjacent antenna elements is L, the azimuth angle in the positional relationship is θ where the front direction of the receiving antenna 50 is 0, and the antenna element interval is d, $\theta = \sin^{-1}(L/d)$. This corresponds to the actual azimuth angle of the target 900.

When the above first main phase is used, the distance relationship shown in FIGS. 6(A) and 6(B) may be obtained. Specifically, in the first sub-phase SF1, where the distance from the antenna element 51 to a hypothetical phase reference surface is "0", the distances from the antenna elements 52, 53, 54 and 55 to the hypothetical phase reference surface are respectively L+2r, 2L+4r, 3L+6r, and 4L+8r. In addition, in the second sub-phase SF2 subsequent to the first phase, where the phase of the receiving signal of the antenna element 55 is 4L, the phases of the receiving signals of the antenna elements 54, 53, 52 and 51 are respectively 3L+2r, 2L+4r, Ld+6r, and 8r.

By so doing, where the azimuth angle detected in the first sub-phase SF1 is $\theta_1$, and the azimuth angle detected in the second sub-phase SF2 is $\theta_2$, the equiphase wave surface is formed in the first sub-phase SF1 in the following direction.

$$\theta 1 = \sin^{-1}((L+2r)/d) \quad \text{(Expression 1)}$$

The equiphase surface is formed in the second sub-phase SF2 in the following direction.

$$\theta 2 = \sin^{-1}((L-2r)/d) \quad \text{(Expression 2)}$$

Thus, from Expression 1 and Expression 2, the following relationship may be obtained.

$$L+2r=d\cdot\sin\theta_1 \quad \text{(Expression 3-1)}$$

$$L-2r=d\cdot\sin\theta_2 \quad \text{(Expression 3-2)}$$

In addition, where the actual azimuth angle is θ, Expression 4 holds.

$$L=d\cdot\sin\theta \quad \text{(Expression 4)}$$

When L, r, and d are eliminated from Expression 3-1, Expression 3-2, and Expression 4, Expression 5 may be obtained.

$$\sin\theta=(\sin\theta_1+\sin\theta_2)/2 \quad \text{(Expression 5)}$$

Therefore, the actual azimuth angle θ is calculated from the following expression.

$$\theta=\sin^{-1}((\sin\theta_1+\sin\theta_2)/2) \quad \text{(Expression 6)}$$

These arithmetic expressions (Expression 5 and Expression 6) do not include a term r of a variation in distance due to the relative velocity, so the calculated azimuth angle θ is not influenced by a variation in distance due to the relative velocity. That is, it is possible to calculate the azimuth angle θ without any influence of a variation in distance due to the relative velocity.

The azimuth angle θ of the target may be calculated from the above arithmetic expressions, so the signal processing unit 1 calculates the azimuth angle θ through the following process flow.

First, the signal processing unit 1 calculates an azimuthal direction spectrum from a group of the receiving signals of the first sub-phase SF1, and then calculates the sine value sin θ$_1$ of the azimuth angle θ$_1$. Next, the signal processing unit 1 calculates an azimuthal direction spectrum from a group of the receiving signals of the second sub-phase SF2 subsequent to the first sub-phase SF1, and then calculates the sine value sin θ$_2$ of the azimuth angle θ$_2$. Then, the signal processing unit 1 applies the calculated Sin θ$_1$ and sin θ$_2$ to Expression 6 and then calculates the azimuth angle θ.

Figure 7:
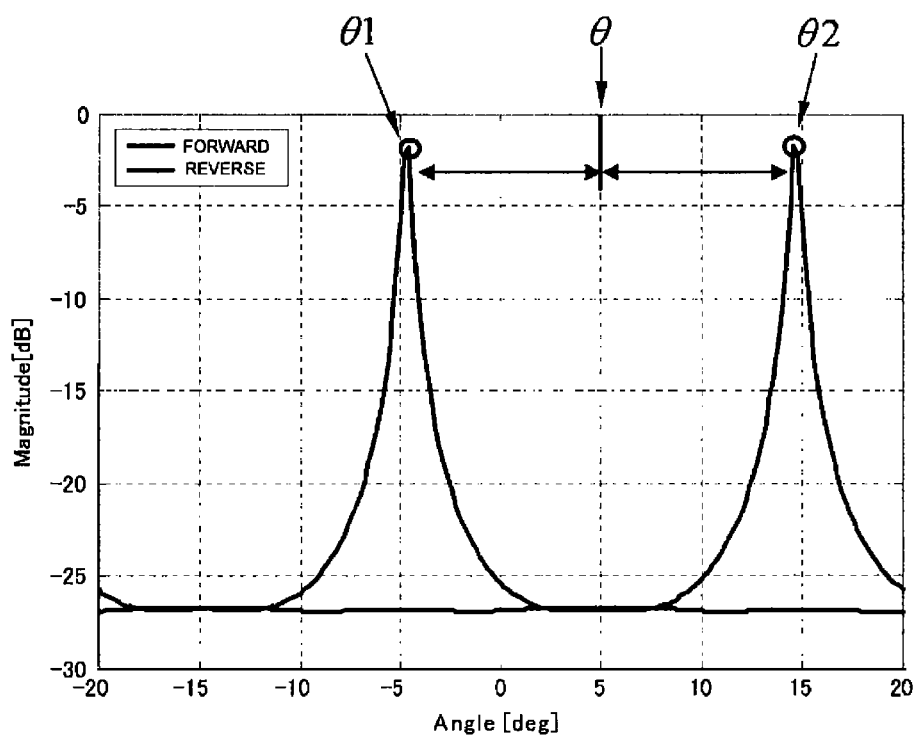
FIG. 7 is a view that shows an azimuthal direction spectrum based on reception signals in a first sub-phase SF1 and an azimuthal direction spectrum based on reception signals in a second sub-phase SF2.

As a specific example, when the number of receiving antenna elements is five, the antenna interval is 1.46λ, (λ is the wavelength of 76 GHz transmission signal), the antenna switching period ΔT is 1 ms, the target azimuth is 5°, and the relative velocity of the target is 30 km/h, simulation is performed using the Capon method. The obtained azimuthal direction spectrum is shown in FIG. 7. FIG. 7 is a view that shows the azimuthal direction spectrum based on the receiving signals in the above first sub-phase and the azimuthal direction spectrum based on the receiving signals in the second sub-phase SF2. Note that in the drawings following FIG. 7, the forward direction indicates a direction along the first sub-phase SF1, and the reverse direction indicates a direction along the second sub-phase SF2.

As shown in FIG. 7, the azimuth θ$_1$ obtained in the first sub-phase SF1 in which the antenna elements are switched in the order of the antenna elements 51, 52, 53, 54 and 55 is −5.00°, and the azimuth θ$_2$ obtained in the second sub-phase SF2 in which the antenna elements 55, 54, 53, 52 and 51 is +15.03°. Thus, the actual azimuth θ is calculated as follows using Expression 6.

$$\theta=\sin^{-1}((\sin(-5.00°)+\sin(15.03°))/2) \quad \text{(Expression 7)}$$

Thus, it is detected that θ=4.94°. This substantially coincides with the azimuth 5.00°, which is defined for simulation.

In this way, using the configuration and process of the present embodiment, the radar apparatus of the present embodiment is able to reliably and accurately detect the target azimuth without a complex process, such as calculating the relative velocity of the target for correction. In addition, because the processing calculation is simple, it is possible to perform highly accurate detection at high speed.

Note that in the above description, the method of calculating a detecting azimuth using sine values is described; instead, in a relatively narrow detecting range in which a sine value may be approximated to an angle, that is, in the range in which sin θ≈θ may be used, the actual azimuth θ may be calculated from the azimuth θ$_1$ in the first sub-phase SF1 and the azimuth θ$_2$ in the second sub-phase SF2 using (Expression 8).

$$\theta=(\theta_1+\theta_2)/2 \quad \text{(Expression 8)}$$

For example, where the detecting azimuth angle ranges from −14.5° to +14.5°, when the azimuth is calculated from an approximate expression shown in (Expression 8), the maximum azimuth error is 0.6°. Thus, when the thus azimuth error is set to an allowable range, it is possible to calculate the target azimuth using (Expression 8) that employs an approximate θ.

In this way, by using an approximate θ, it is possible to reduce the amount of operations for calculating the target azimuth.

Incidentally, in the above description, the interval d of the antenna elements 51 to is equal. Furthermore, when the interval d of the antenna elements is set to be larger than or equal to 0.5λ, it is possible to reliably detect the target azimuth.

Figure 8B:
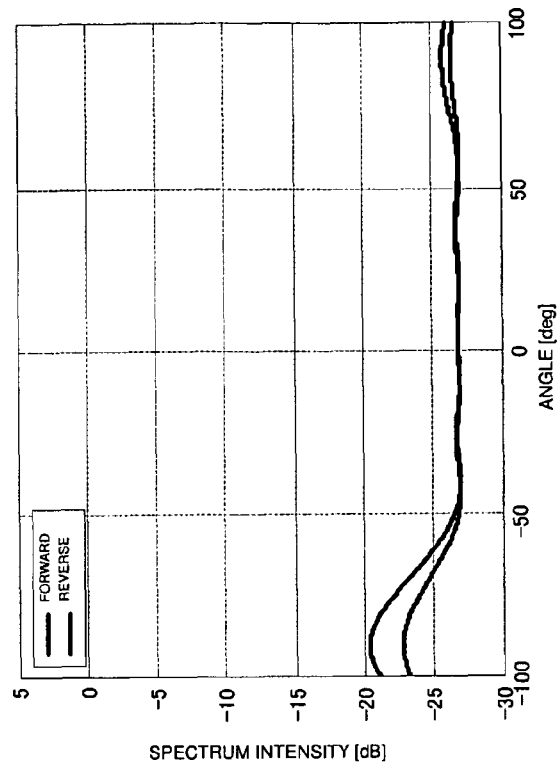
FIGS. 8(A) and 8(B) are views that show azimuthal direction spectra.
Figure 8A:
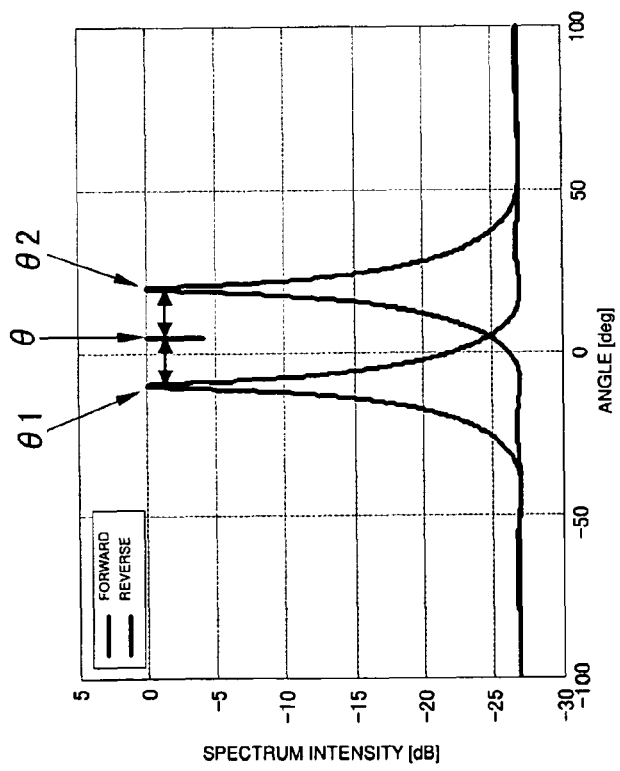

FIGS. 8(A) and 8(B) are views that show direction spectra. FIG. 8(A) shows the case where the relative velocity of the target is 0.2 m/s. FIG. 8(B) shows the case where the relative velocity of the target is 1.0 m/s.

When the antenna element interval is d, the detecting range of a distance difference between the adjacent antenna elements is from −d+nλ to +d+nλ (n is an integer). That is, unless a distance difference that is obtained by adding a distance difference based on the positional relationship between the antenna elements and the target and a distance difference caused by the relative velocity falls within the range of −d+nλ to +d+nλ, the spectrum peaks of the azimuthal direction spectrum shown in FIG. 7 cannot be obtained.

When the antenna element interval d is smaller than 0.5λ, and, for example, d=0.4λ, the distance difference detecting range is from −0.4λ+nλ to 0.4λ+nλ. When the antenna switching period ΔT is 1 ms, and the relative velocity of the target is 0.2 m/s, a variation in distance due to the relative velocity between the adjacent antenna elements is 0.1λ. This falls within the above described range from −0.4λ+nλ to 0.4λ+nλ, so the spectrum peaks are obtained (see FIG. 8(A)) and, therefore, azimuth detection is possible. Incidentally, when the relative velocity of the target is 1.0 m/s, a variation in distance due to the relative velocity between the adjacent antenna elements is 0.51λ. This does not fall within the range of −0.4λ+nλ to 0.4λ+nλ, so no spectrum peak is obtained (see FIG. 8(B)) and, therefore, azimuth detection cannot be performed accurately.

On the other hand, when the antenna element interval d is larger than or equal to 0.5λ, and, for example, d=0.6λ, the detecting range of a distance difference between the adjacent antenna elements is from (−0.6+n)λ to (0.6+n)λ. In this case, the range in the case of n=m overlaps the range in the case of n=m+1, so all distance differences may be detected. That is, a distance difference that is obtained by adding a distance difference based on the positional relationship between the antenna elements and the target and a distance difference caused by the relative velocity reliably falls within the range of −d+nλ to +d+nλ. As a result, with the antenna element interval d larger than or equal to $0.5\lambda$, the spectrum peaks of the azimuthal directions may be reliably obtained and, therefore, it is possible to detect the target azimuth.

Incidentally, in the above description, with the antenna element interval d larger than or equal to $0.5\lambda$, the spectrum peaks may be reliably and easily obtained. Instead, even when the antenna element interval d is smaller than $0.5\lambda$, by virtually setting the antenna element interval d so as to be larger than or equal to $0.5\lambda$ in the arithmetic calculation of the Capon method or beamformer method, it is possible to obtain the spectrum peaks.

In the Capon method, beamformer method, or the like, a mode vector shown in the following expression is used for direction of arrival estimation calculation.

$$a(\theta)=[\exp(-j\cdot(2\pi/\lambda)\cdot d1\cdot\sin\theta), \exp(-j\cdot(2\pi/\lambda)\cdot d2\cdot\sin\theta), \ldots, \exp(-j\cdot(2\pi/\lambda)\cdot dk\cdot\sin\theta)]^T \quad \text{(Expression A)}$$

Here, $a(\theta)$ is a mode vector for an estimated direction $\theta$, $d1$ to $dk$ are antenna intervals when, in $k+1$ antenna elements, the position of one antenna element is set to a reference position. When the antenna element interval d is smaller than $0.5\lambda$, $d1$ to $dk$ of (Expression A) do not use the actual antenna element interval d but use a virtually set antenna element interval $d'$.

Figure 9A:
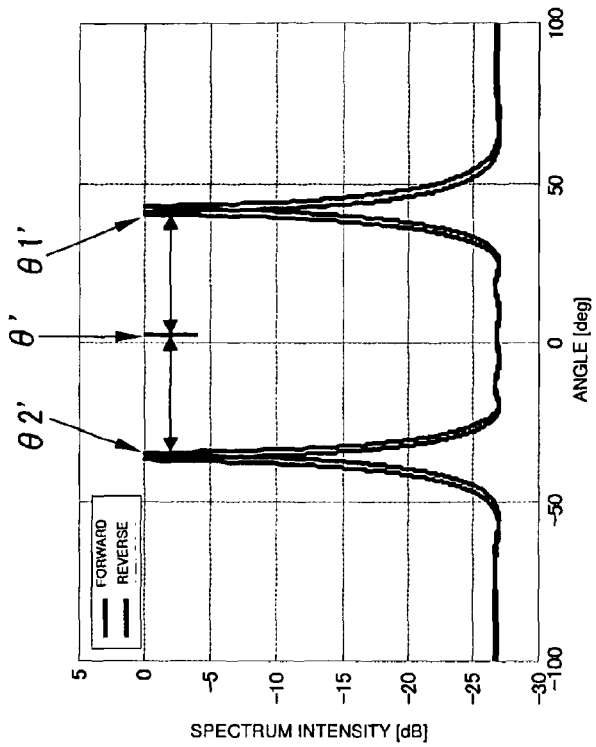
FIGS. 9(A) and 9(B) are views that show azimuthal direction spectra in actual antenna element interval setting and in virtual antenna element interval setting.
Figure 9B:
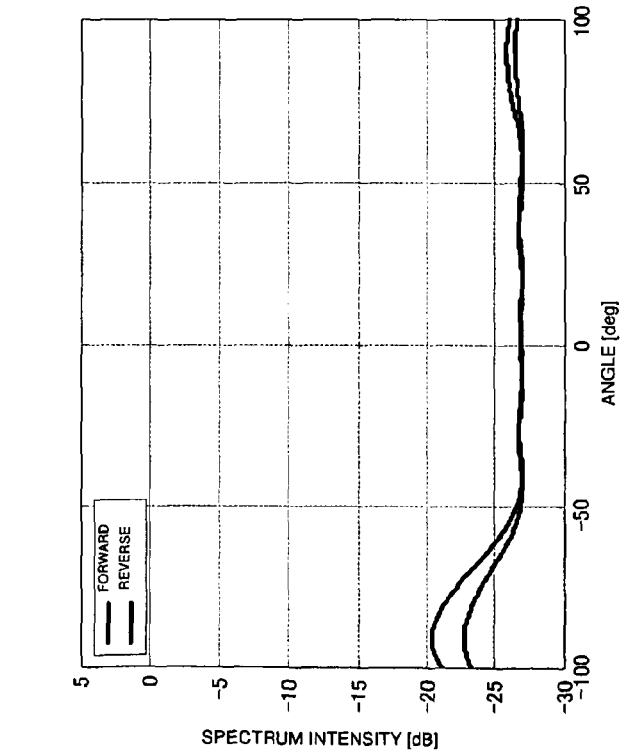

Through the above calculation process, the azimuthal direction spectrum shown in FIG. 9(B) may be obtained. FIGS. 9(A) and 9(B) are views that show azimuthal direction spectra. FIG. 9(A) shows the case where the actual antenna element interval d is used. FIG. 9(B) shows the case where the virtually set antenna element interval $d'=2d$ is used. Note that the azimuthal direction spectra shown in FIGS. 9(A) and 9(B) are obtained under the same condition as that of the azimuthal direction spectrum shown in FIG. 8(B). That is, FIG. 9(A) and FIG. 8(B) show the same results.

As shown in FIG. 9(B), when the antenna element interval $d'$ is virtually set so as to be larger than or equal to $0.5\lambda$, steep spectrum peaks are obtained.

In this way, by virtually setting the antenna element interval so as to be larger than or equal to $0.5\lambda$, even when the actual antenna element interval d is smaller than $0.5\lambda$, it is possible to obtain the spectrum peaks without any influence of the relative velocity.

By substituting the azimuth $\theta_1'$ in the first sub-phase SF1 and the azimuth $\theta_2'$ in the second sub-phase SF2 based on the thus obtained spectrum peaks into (Expression 8), it is possible to obtain a calculated azimuth $\theta'$.

$$\theta'=(\theta_1'+\theta_2')/2$$

Note that FIG. 9(B) shows an example in which a plurality of the spectrum peaks appear; however, as will be described later, by appropriately setting the detecting azimuth angle range, it is possible to easily detect the actual azimuth.

The thus obtained calculated azimuth $\theta'$ differs from the actual azimuth $\theta$. However, the actual azimuth $\theta$ and the calculated azimuth $\theta'$ have the following relationship.

$L=d\cdot\sin\theta=d'\cdot\sin\theta'$ where the distance to the equiphase surface is L.

Thus, the actual azimuth $\theta'$ may be obtained from the following expression.

$$\theta=\sin^{-1}((d'/d)\cdot\sin\theta') \quad \text{(Expression B)}$$

In this way, even when the antenna element interval d is actually smaller than $0.5\lambda$, in the arithmetic calculation, the antenna element interval $d'$ is virtually set so as to be larger than or equal to $0.5\lambda$, the number of processing operations increases; however, the azimuth $\theta$ may be obtained.

Next, a radar apparatus according to a second embodiment will be described with reference to the accompanying drawings. The radar apparatus of the present embodiment differs from the radar apparatus of the first embodiment only in the antenna interval d, and the other configuration is the same as that of the radar apparatus of the first embodiment.

As the relative velocity of the target increases, a distance difference r caused by the relative velocity between the adjacent antenna elements also increases. Generally, when the distance difference r caused by the relative velocity is designed to fall within the range of $-\lambda/2$ to $+\lambda/2$, ambiguity does not occur. However, when the phase difference r due to the relative velocity falls outside the range of $-\lambda/2$ to $+\lambda/2$, it is impossible to determine whether it is r or $r+n\lambda$ (n is an integer).

In this case, where the azimuth of the first sub-phase SF1 is $\theta_1$, and the azimuth of the second sub-phase SF2 is $\theta_2$, the following expressions hold.

$$L+2r+n\lambda=d\cdot\sin\theta_1 \quad \text{(Expression 9-1)}$$

$$L-2r+m\lambda=d\cdot\sin\theta_2 \quad \text{(Expression 9-2)}$$

where n and m are arbitrary integers.

Then, a plurality of candidates of azimuths having the above combination are obtained. Here, the actual azimuth $\theta$ is obtained from (Expression 4).

$$L=d\cdot\sin\theta \quad \text{(Expression 4)}$$

Thus, from (Expression 4), (Expression 9-1) and (Expression 9-2), $$\sin\theta=(\sin\theta_1+\sin\theta_2)/2-(n+m)\lambda/(2d) \quad \text{(Expression 10) Where } n+m=n',$$

$$\sin\theta=(\sin\theta_1+\sin\theta_2)/2-n'\lambda/(2d) \quad \text{(Expression 11)}$$

From (Expression 11), the candidate of the sine value $\sin\theta$ of the actual azimuth $\theta$ appears at an interval of $\lambda/(2d)$.

Utilizing that the sine value sine appears at an interval of $\lambda/(2d)$, where the minimum value of the scope of $\theta$ is $\sin\theta_{min}$ and the maximum value thereof is $\sin\theta_{max}$, the relationship is set as follows.

$$\sin\theta_{max}-\sin\theta_{min}<\lambda/(2d) \quad \text{(Expression 12)}$$

Then, the value of the integer $n'$ in (Expression 11) is uniquely determined and, therefore, it is possible to reliably detect the actual azimuth $\theta$.

Thus, from (Expression 12), $$d<(1/(\sin\theta_{max}-\sin\theta_{min}))*\lambda/2 \quad \text{(Expression 13)}$$

Thus, it is only necessary to perform installation so that the antenna element interval d satisfies the condition of (Expression 13).

At this time, as shown in (Expression 9-1) and (Expression 9-2), the azimuth $\theta_1$ of the first sub-phase SF1 and the azimuth $\theta_2$ of the second sub-phase SF2 have a grating lobe. Conversely, in the present embodiment, the antenna interval is set so as to intentionally have a grating lobe. With the above configuration, a plurality of spectrum peaks occur. That is, the azimuth $\theta_1$ of the first sub-phase SF1 and the azimuth $\theta_2$ of the second sub-phase SF2 respectively can take a plurality of values. Thus, the candidate of the actual azimuth $\theta$ may be obtained for each combination of the azimuth $\theta_1$ of the first sub-phase SF1 and the azimuth $\theta_2$ of the second sub-phase SF2. Here, as shown in (Expression 12), by limiting the sine value $\sin\theta$, of the azimuth $\theta$, it is possible to determine the actual azimuth $\theta$.

Utilizing the above principle, the signal processing unit 1 respectively detects a plurality of sine values $\theta_1$ of the azimuth $\theta_1$ of the first sub-phase SF1 and a plurality of sine values $\sin\theta_2$ of the azimuth $\theta_2$ of the second sub-phase SF2.

At this time, depending on the setting condition, any one of the sine values $\sin\theta_1$ and $\sin\theta_2$ may possibly be single.

The signal processing unit 1 respectively combines the plurality of obtained sine values $\sin\theta_1$ and with the plurality of obtained sine values $\sin\theta_2$ and then calculates the candidate of the sine value $\sin\theta$ of the actual azimuth for each combination. Then, the signal processing unit 1 determines whether each candidate of the obtained sine value $\sin\theta$ applies to (Expression 12), and calculates the actual azimuth $\theta$ from the applicable one sine value $\theta$.

In such a case, the signal processing unit 1 sets the estimated detecting azimuth angle range in the beamformer method or Capon method so that many sine values $\sin\theta_1$ of the azimuths $\theta_1$ of the first sub-phase SF1 and many sine values $\sin\theta_2$ of the azimuths $\theta_2$ of the second sub-phase SF2, for example, at least three or more of the total of the sine values $\sin\theta_1$ of the azimuths $\theta_1$ of the first sub-phase SF1 and the sine values $\sin\theta_2$ of the azimuths $\theta_2$ of the second sub-phase SF2, may be obtained. Thus, it is possible to reliably obtain the actual azimuth $\theta$.

Figure 10:
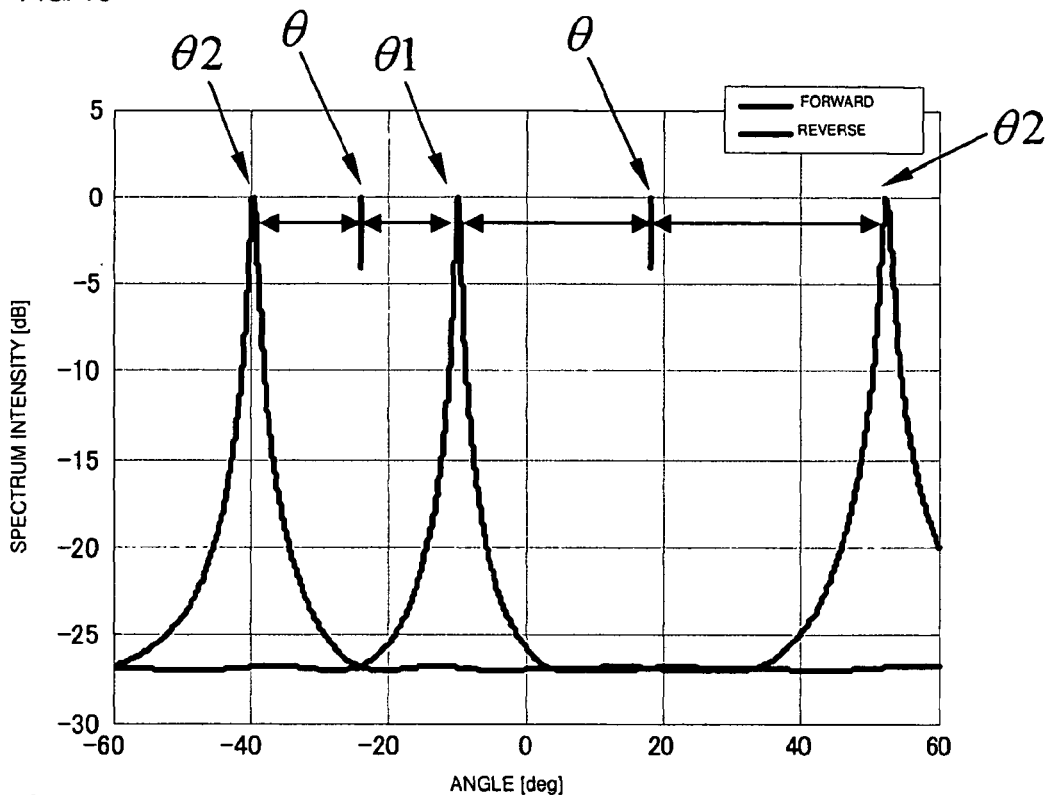
FIG. 10 is a view that shows an example of an azimuthal direction spectrum obtained through the configuration and process according to a second embodiment.

FIG. 10 is a view that shows an example of the azimuthal direction spectrum obtained through the configuration and process according to the present embodiment. The azimuthal direction spectrum shown in FIG. 10 is the result of simulation when the frequency of a transmission signal is 76 GHz, the wavelength $\lambda$ is 3.9 mm, the antenna element interval d is 0.7$\lambda$, the switching interval $\Delta T$ is 1 ms, the target azimuth $\theta$ is 18°, and the relative velocity of the target is 30.6 km/h.

As shown in FIG. 10, in the above condition, one azimuth $\theta_1$ of the first sub-phase SF1 is present, and two azimuths $\theta_2$ of the second sub-phase SF2 are present. Thus, two candidates of the actual azimuth $\theta$ are calculated, that is, −23.9° and +18.0°.

Figure 11:
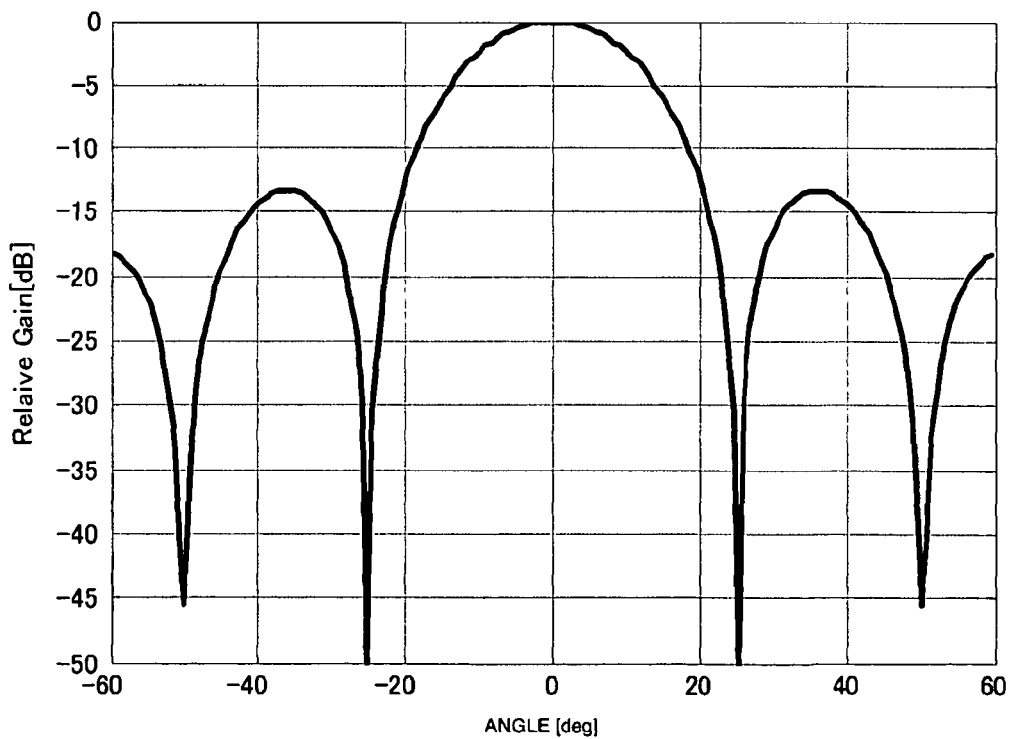
FIG. 11 is a view that shows a transmission and reception beam pattern according to the second embodiment.

Here, the signal processing unit 1 sets the detecting azimuth angle range to the range of −20° to +20° on the basis of the inverse operation of (Expression 13). Furthermore, the structure and configuration of the transmitting antenna and receiving antenna are set so as to form a transmission and reception beam pattern as shown in FIG. 11. FIG. 10 is a view that shows a transmission and reception beam pattern according to the present embodiment.

With the configuration, setting and process as described above, the signal processing unit 1 determines +18.0° as the actual azimuth $\theta$.

Figure 12A:
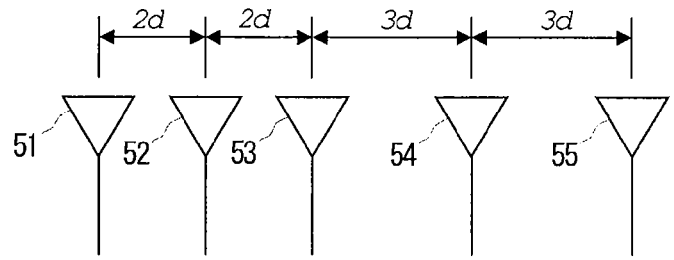
FIG. 12(A) is a view that shows an antenna element interval and FIG. 12(B) is a view that illustrates a state of synchronization between a transmission control and a switching control in a third embodiment.
Figure 12B:
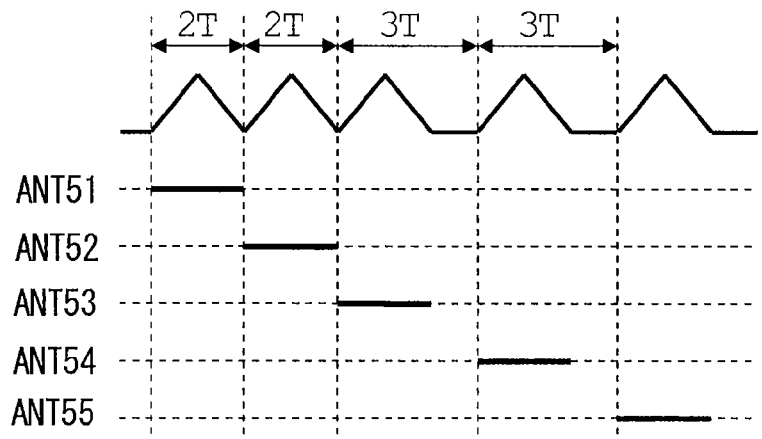

Next, a radar apparatus according to a third embodiment will be described with reference to the accompanying drawings. The radar apparatus of the present embodiment differs from the radar apparatus of the first embodiment in that the antenna element interval is not equal, and the other configuration is the same as that of the radar apparatus of the first embodiment. FIG. 12(A) is a view that shows the antenna element interval. FIG. 12(B) is a view that illustrates a state of synchronization between a transmission control and a switching control.

As shown in FIG. 12(A), in the radar apparatus of the present embodiment, the intervals of the antenna elements 51 to 55 are set to 2d, 2d, 3d, and 3d in the order from the side of the antenna element 51. Then, as shown in FIG. 12(B), when the signal processing unit 1 switches the antenna element in the order of the antenna elements 51, 52, 53, 54 and 55, the signal processing unit 1 switches the antenna element at time intervals of 2T, 2T, 3T, and 3T.

In the case of an unequally-spaced array antenna, the interval of occurrence of a grating lobe is determined by the greatest common divisor of the antenna element intervals. Thus, where the greatest common divisor of the antenna element intervals is d, from the conditions of the above described first and second embodiments, d is determined so as to satisfy the following expression.

$$0.5\lambda < d < (1/\sin\theta_{max})\cdot(\lambda/4) \qquad \text{(Expression 14)}$$

Thus, the actual azimuth $\theta$ may be uniquely determined.

Using the above configuration and process, it is possible to improve azimuth resolution by the unequally-spaced array and reliably detect the actual azimuth $\theta$. That is, it is possible to highly accurately and reliably detect the actual azimuth $\theta$.

Figure 13:
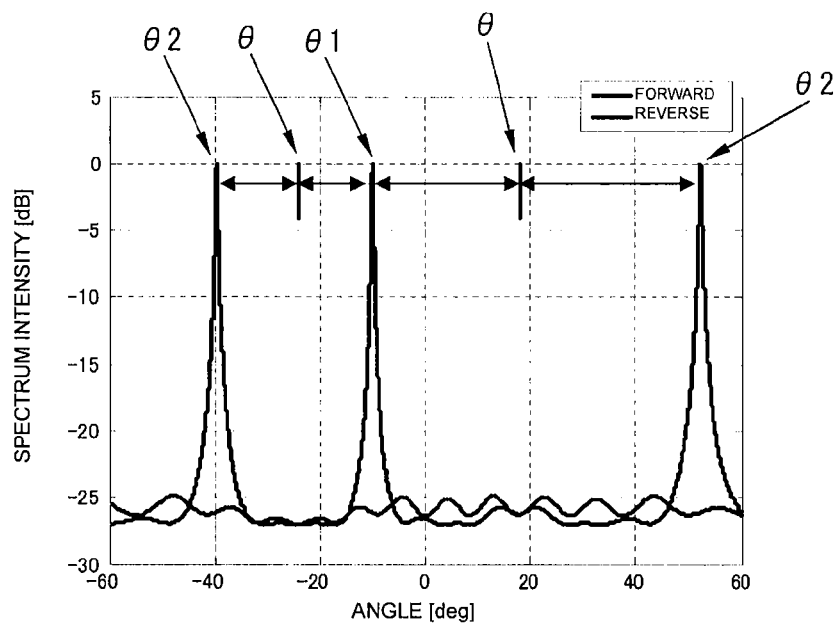
FIG. 13 is a view that shows a specific azimuthal direction spectrum when the configuration and process of the third embodiment are applied.

FIG. 13 is a view that shows a specific azimuthal direction spectrum when the configuration and process of the present embodiment is used. The azimuthal direction spectrum shown in FIG. 13 is the result of simulation when the frequency of a transmission signal is 76 GHz, the wavelength $\lambda$ is 3.9 mm, the greatest common divisor d of the antenna element intervals is 0.7$\lambda$, the greatest common divisor T of the switching period is 1 ms, the target azimuth $\theta$ is 18°, and the relative velocity of the target is 30.6 km/h.

In the case of the above process, as shown in FIG. 13, the spectrum peaks are steeper than the case shown in FIG. 10. By so doing, the azimuth $\theta_1$ of the first sub-phase SFT1 and the azimuth $\theta_2$ of the second sub-phase SF2 are detected with high accuracy. Then, by combining these azimuths $\theta_1$ and $\theta_2$, the candidate of the actual azimuth $\theta$ may be obtained with high accuracy. In the example of FIG. 13, −24.0° and +17.9° are obtained. Then, by applying the detecting azimuth angle range of −20° to +20° obtained from the above described conditions, it is possible to uniquely detect the actual azimuth $\theta$ as +17.9°.

Next, a radar apparatus according to a fourth embodiment will be described with reference to the accompanying drawings. In the present embodiment, an estimated calculating azimuth angle range (estimated calculating azimuth angle range) is set, and the other configuration is the same as that of the radar apparatus shown in the third embodiment.

When the estimated calculating azimuth angle range is set to the range of −$\theta$cal to +$\theta$cal, the maximum calculating azimuth angle $\theta$cal is set as follows.

$$\theta cal = \sin^{-1}(\lambda/(2d)) \qquad \text{(Expression 15)}$$

This relational expression is derived from the above described principle, and, when settings shown in (Expression 15) are performed, the spectrum peak is one for each of the azimuth $\theta_1$ of the first sub-phase SF1 and the azimuth $\theta_2$ of the second sub-phase SF2.

Then, in the case of the condition shown in (Expression 15), $(\sin\theta_1 + \sin\theta_2)/2$ obtains any one of the relational expressions shown in (Expression 16), (Expression 18) and (Expression 20).

In the case of Expression 16

$$-\lambda/(4d) < (\sin\theta_1 + \sin\theta_2)/2 < +\lambda/(4d) \qquad \text{(Expression 16)}$$

In the case of (Expression 16), the sine value sine of the actual azimuth $\theta$ is obtained from (Expression 17) (which corresponds to (Expression 5)).

$$\sin\theta = (\sin\theta_1 + \sin\theta_2)/2 \qquad \text{(Expression 17)}$$

In the case of Expression 18

$$(\sin\theta_1 + \sin\theta_2)/2 < -\lambda/(4d) \qquad \text{(Expression 18)}$$

In the case of (Expression 18), the sine value $\sin\theta$ of the actual azimuth $\theta$ is obtained from (Expression 19).

$$\sin\theta = (\sin\theta_1 + \sin\theta_2)/2 + \lambda/(2d) \qquad \text{(Expression 19)}$$

In the case of Expression 20

$$(\sin\theta_1 + \sin\theta_2)/2 > +\lambda/(4d) \qquad \text{(Expression 20)}$$

In the case of (Expression 20), the sine value sin θ of the actual azimuth θ is obtained from (Expression 21).

$$\sin\theta = (\sin\theta_1 + \sin\theta_2)/2 - \lambda/(2d) \quad \text{(Expression 21)}$$

Through the above process, it is possible to further simply and reliably detect the actual azimuth θ.

In this case, the signal processing unit 1 calculates the azimuth $\theta_1$ of the first sub-phase SF1 and the azimuth $\theta_2$ of the second sub-phase SF2 within the estimated calculating azimuth angle range of −θcal to +θcal, which is set on the basis of the maximum calculating azimuth angle θcal expressed by (Expression 15). Then, the signal processing unit 1 classifies them on the basis of the conditions of (Expression 16), (Expression 18) and (Expression 20), and selects any one of (Expression 17), (Expression 19) and (Expression 21) to calculate the actual azimuth θ.

Figure 14:
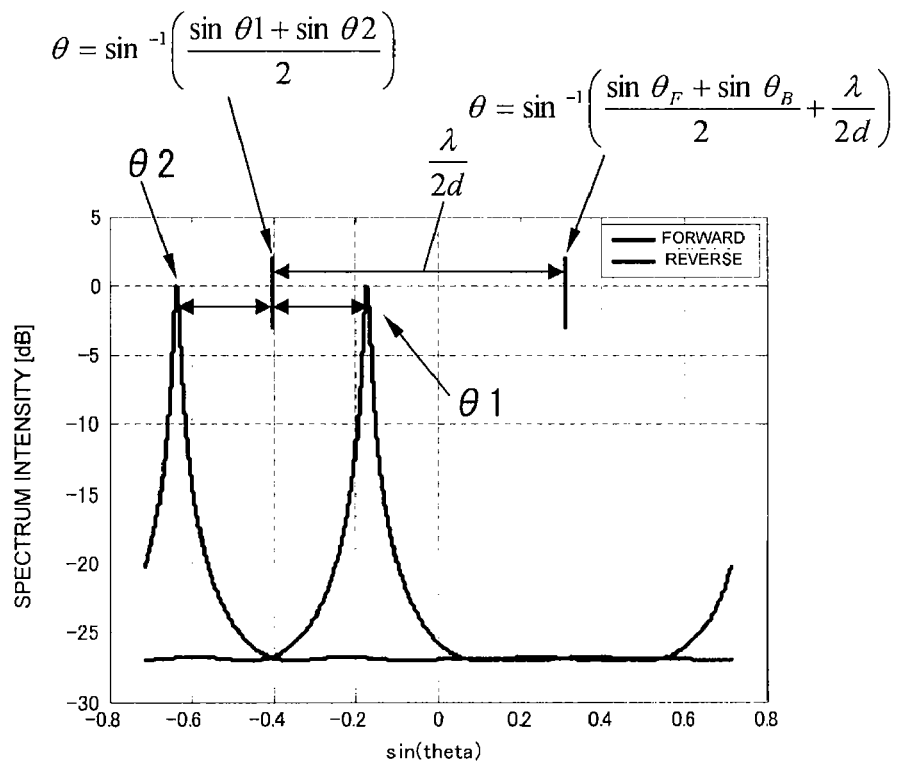
FIG. 14 is a view that shows an azimuthal direction spectrum when the configuration and process of a fourth embodiment are applied.

Specifically, the process when the spectrum peaks as shown in FIG. 14 are obtained will be described. FIG. 14 is a view that shows an azimuthal direction spectrum when the configuration and process of the present embodiment are applied. Note that the conditions of the simulation is the same as that of FIG. 10 of the second embodiment. First, the signal processing unit 1 calculates the maximum calculating azimuth angle θcal as 45.6° from the greatest common divisor d of the antenna element intervals and the wavelength λ of the transmission signal, and sets the estimated calculating azimuth angle range to the range of −45.6° to +45.6°. Next, the signal processing unit 1 calculates the following expression from the obtained azimuth $\theta_1$ of the first sub-phase SF1 and the azimuth $\theta_2$ of the second sub-phase SF2.

$$\sin\theta = (\sin\theta_1 + \sin\theta_2)/2 \quad \text{(Expression 22)}$$

In this simulation, the value of (Expression 22) is −0.406, and is smaller than (−2/(4d)). This means that the condition of (Expression 18) is satisfied. The signal processing unit 1 detects this, and uses (Expression 19), that is, $$\sin\theta = (\sin\theta_1 + \sin\theta_2)/2 + \lambda/(2d),$$

to calculate sin θ to thereby calculate the actual azimuth θ. Through the above process, the signal processing unit 1 is able to calculate the actual azimuth θ uniquely as 18.0°.

In the present embodiment as described above, because the estimated calculating azimuth angle range may be substantially narrower than the above described embodiments, it is possible to reduce the operation load on azimuth calculation.

Figure 15:
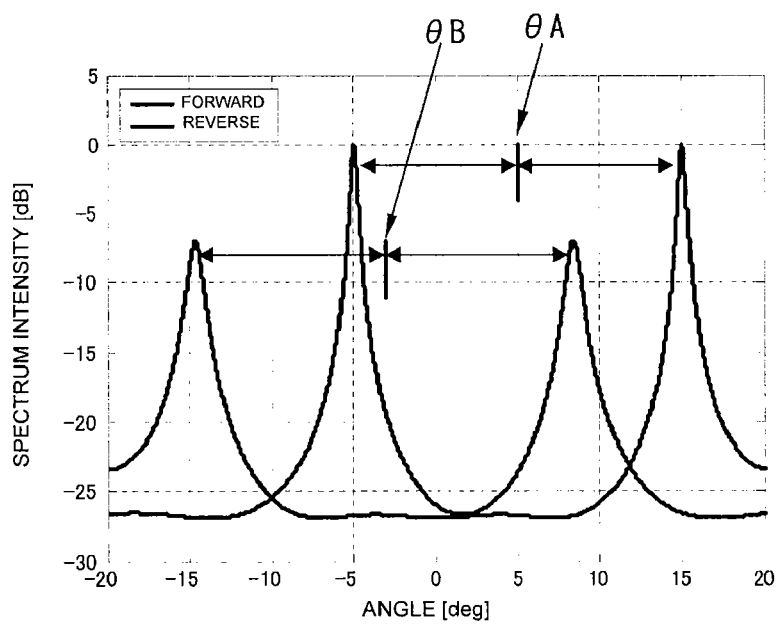
FIG. 15 is a view that shows an azimuthal direction spectrum when a plurality of targets are present at the same distance in different directions.

Note that in each of the above embodiments, the case in which the target is single is described as an example; however, there is a case in which a plurality of targets are present at substantially equal distance from the host apparatus within the detecting area. FIG. 15 is a view that shows an azimuthal direction spectrum when a plurality of targets are present at the same distance in different directions.

When the desired targets are the same (single), the level of the spectrum peak based on the receiving signals of the first sub-phase SF1 is substantially equal to the level of the spectrum peak based on the receiving signals of the second sub-phase SF2. Thus, the spectrum peak level differs among each target, and the spectrum peak level of the first sub-phase SF1 and the spectrum peak level of the second sub-phase SF2 against the same target are substantially the same.

Using this characteristic, the signal processing unit 1 pairs the spectrum peak of the first sub-phase SF1 with the spectrum peak of the second sub-phase SF2 on the basis of the peak level from the obtained spectrum peaks. Then, the signal processing unit 1 uses the paired spectrum peak of the first sub-phase SF1 and spectrum peak of the second sub-phase SF2, and detects the actual azimuths θA and θB through the above described various methods. Using the above processing method, even when a plurality of targets are present at the same distance from the host apparatus in different azimuths θA and θB, it is possible to reliably and highly accurately detect the respective azimuths.

In addition, in the above described embodiments, as an example of switching of the antenna elements, the antenna elements are switched in the order of 51, 52, 53, 54, and 55 in the first sub-phase SF1, and the antenna elements are switched in the order of 55, 54, 53, 52, and 51 in the second sub-phase SF2. However, it is also applicable that (1) the antenna elements are switched in the order of 51, 53 and 55 in the first sub-phase SF1 and the antenna elements are switched in the order of 55, 53, and 51 in the second sub-phase SF2, (2) the antenna elements are switched in the order of 51, 52, and 53 in the first sub-phase SF1 and the antenna elements are switched in the order of 55, 54, and 53 in the second sub-phase SF2, (3) the antenna elements are switched in the order of 51, 53, and 54 in the first sub-phase SF1 and the antenna elements are switched in the order of 55, 54, and 52 in the second sub-phase SF2, or the like. That is, it is only necessary that, in the main phase formed of the first sub-phase SF1 and the second sub-phase SF2, the antenna elements are switched so that a phase difference due to the relative velocity is substantially zero as a whole.

In addition, in the above embodiments, an example in which the receiving antenna is formed as an array antenna formed of a plurality of arranged antenna elements is described; instead, even when the transmitting antenna is formed as an array antenna or both the transmitting antenna and the receiving antenna are formed as array antennas, the same advantageous effects as described above may be obtained.

In addition, in the above described embodiments, an example that uses a transmission signal that is modulated into a triangular wave is described; instead, a transmission signal that is modulated into a sawtooth wave may also be used. Furthermore, the first sub-phase SF1 and the second sub-phase SF2 may be set only in the up modulation section or down modulation section of a triangular wave modulation.

The invention claimed is:

1. A radar target detecting method in which either one or both of a transmitting antenna and a receiving antenna is formed of a plurality of antenna elements arranged in a straight line to detect a target, the radar target detecting method comprising:

setting a switching pattern of the plurality of antenna elements arranged in the straight line, the switching pattern switching the plurality of antenna elements in synchronization with a modulation period of a transmission signal so as to detect the target using acquired receiving signals, and the switching pattern switching the plurality of antenna elements so that the total of phase differences between the plurality of antenna elements due to a relative velocity of the target is substantially zero.

2. The radar target detecting method according to claim 1, wherein the switching pattern includes a first sub-phase and a second sub-phase, and a first deviation in phase due to the relative velocity of the target developed in switching of the first sub-phase, and a second deviation in phase due to the relative velocity of the target developed in switching of the second sub-phase, are in opposite phases and are substantially equal in magnitude.

3. The radar target detecting method according to claim 2, wherein
the switching pattern is set so that a first pattern of switching in a first direction along the straight line in which the plurality of antenna elements are arranged is set as the first sub-phase and a second pattern of switching in a second direction opposite to the first direction as the second sub-phase, and
a first number of switchings in the first sub-phase and distances between the antenna elements caused by the switchings are equal to a second number of switchings in the second sub-phase and distances between the antenna elements caused by the switchings.

4. The radar target detecting method according to claim 3, wherein a detected azimuth of the target is calculated on the basis of a first azimuth that is estimated from an IF beat signal obtained by the switching in the first direction and a second azimuth that is estimated from an IF beat signal obtained by the switching in the second direction.

5. The radar target detecting method according to claim 4, wherein where the sine of the first azimuth is $\sin \theta_1$, the sine of the second azimuth is $\sin \theta_2$, and the sine of the azimuth of the target is $\sin \theta$, the azimuth of the target is calculated using the following arithmetic expression $$\sin \theta = (\sin \theta_1 + \sin \theta_2)/2.$$

6. The radar target detecting method according to claim 4, wherein when a plurality of the first azimuths and a plurality of the second azimuths are respectively obtained, a spectrum intensity of each of the first azimuths is compared with a spectrum intensity of each of the second azimuths, and the azimuths having an equal spectrum intensity are combined.

7. The radar target detecting method according to claim 1, wherein an interval d at which the plurality of antenna elements are arranged in the straight line is set to be larger than or equal to $0.5\lambda$ with respect to a wavelength $\lambda$ of the transmission and the reception signals.

8. The radar target detecting method according to claim 7, wherein the plurality of antenna elements arranged in the straight line are set at unequal intervals, and an interval, which is the greatest common divisor of the unequal intervals, coincides with the interval d.

9. The radar target detecting method according to claim 8, wherein a switching interval of the plurality of antenna elements arranged at the unequal intervals is set on the basis of a distance between the plurality of antenna elements.

10. The radar target detecting method according to claim 1, wherein when an interval d at which the plurality of antenna elements are arranged in the straight line is smaller than $0.5\lambda$ with respect to a wavelength $\lambda$ of the transmission and the reception signals, an interval of the antenna elements is set larger than or equal to $0.5\lambda$ at a time of calculating an azimuth, and the azimuth is corrected to correspond to a setting in which the interval is smaller than $0.5\lambda$.

11. The radar target detecting method according to claim 1, wherein where a front direction of the radar apparatus is 0°, a detecting azimuth angle range is set within a range from $\theta\text{min}$ to $\theta\text{max}$, the range of $\theta\text{min}$ to $\theta\text{max}$ is set within a range of −90° to +90°, an interval at which the plurality of antenna elements are arranged in the straight line is d, and a wavelength of transmission and reception signals is $\lambda$, the interval at which the plurality of antenna elements are arranged in the straight line is set so as to satisfy the following expression $$d < (1/(\sin \theta\text{max} - \sin \theta\text{min})) \cdot (\lambda/2).$$

12. The radar target detecting method according to claim 1, wherein where a front direction of the radar apparatus is set to 0°, a calculating azimuth angle range is set within a range from $-\theta\text{cal}$ to $\theta\text{cal}$ including 0°, an interval at which the plurality of antenna elements are arranged in the straight line is d, and a wavelength of at least one of a transmission and reception signal is $\lambda$, an azimuth of the target is calculated within the calculating azimuth angle range set by the following expression $$\theta\text{cal} = \sin^{-1}(\lambda/2d).$$

13. A radar apparatus comprising:
a transmitting antenna and a receiving antenna, either one or both of which are formed of a plurality of antenna elements arranged in a straight line;
a switching device that switches the plurality of antenna elements in synchronization with a modulation period of a transmission signal; and
a target detecting device that detects a target using acquired reception signals, wherein
the switching device switches the plurality of antenna elements so that a total of phase differences between the antennas due to a relative velocity of the target is substantially zero.

14. The radar apparatus according to claim 13, wherein the switching device switches the plurality of antenna elements with a switching pattern that includes a first sub-phase and a second sub-phase in which deviations in phase due to the relative velocity of a target developed in the respective switchings are in opposite phases and are substantially equal in magnitude.

15. The radar apparatus according to claim 14, wherein the switching device sets a first pattern of switching in a first direction along the straight line in which the plurality of antenna elements are arranged as the first sub-phase and sets a second pattern of switching in a second direction opposite to the first direction as the second sub-phase, and switches the plurality of antenna elements so that a number of switchings in the first sub-phase and distances between the antenna elements caused by the switchings are equal to a number of switchings in the second sub-phase and distances between the antenna elements caused by the switchings.

16. The radar apparatus according to claim 15, wherein the target detecting device estimates a first azimuth on the basis of an IF beat signal obtained by the switching in the first direction and estimates a second azimuth on the basis of an IF beat signal obtained by the switching in the second direction, and calculates an azimuth of the target on the basis of the first azimuth and the second azimuth.

17. The radar apparatus according to claim 16, wherein where the sine of the first azimuth is $\sin \theta_1$, the sine of the second azimuth is $\sin \theta_2$, and the sine of the azimuth of the target is sine, the target detecting device calculates the azimuth of the target using the following arithmetic expression $$\sin \theta = (\sin \theta_1 + \sin \theta_2)/2.$$

18. The radar apparatus according to claim 16, wherein the target detecting device, when a plurality of the first azimuths and a plurality of the second azimuths are respectively obtained, compares a spectrum intensity of each of the first azimuths with a spectrum intensity of each of the second azimuths and then combines the azimuths having an equal spectrum intensity.

19. The radar apparatus according to claim 13, wherein the plurality of antenna elements arranged in the straight line are arranged at an interval d that is larger than or equal to $0.5\lambda$ with respect to a wavelength $\lambda$ of the transmission and reception signals.

20. The radar apparatus according to claim 19, wherein the plurality of antenna elements arranged in the straight line are set at unequal intervals, and a greatest common divisor of the unequal intervals coincides with the interval d.

21. The radar apparatus according to claim 20, wherein the switching device switches the plurality of antenna elements arranged at the unequal intervals on the basis of a distance between the plurality of antenna elements.

22. The radar apparatus according to claim 13, wherein
the plurality of antenna elements arranged in the straight line are arranged at an interval d smaller than $0.5\lambda$ with respect to a wavelength $\lambda$ of the transmission and reception signals, and
the target detecting device sets an interval of the plurality of antenna elements so as to be larger than or equal to $0.5\lambda$ at the time of calculating an azimuth and, after the azimuth is calculated, corrects the calculated azimuth to an azimuth corresponding to a setting in which the interval is smaller than $0.5\lambda$.

23. The radar apparatus according to claim 13, wherein the plurality of antenna elements are arranged in the straight line so that, where a front direction of the radar apparatus is $0°$, a detecting azimuth angle range is set within a range from $\theta min$ to $\theta max$, the $\theta min$ and $\theta max$ each are set within a range of $-90°$ to $+90°$, an interval of the plurality of antenna elements arranged in the straight line is d, a wavelength of the transmission and reception signals is $\lambda$, the following expression is satisfied $$d<(L/(\sin \theta max - \sin \theta min))\cdot(\lambda/2).$$

24. The radar apparatus according to claim 13, wherein where a front direction of the radar apparatus is set to $0°$, a calculating azimuth angle range is set within a range from $-\theta cal$ to $\theta cal$ including $0°$, an interval at which the plurality of antenna elements are arranged in the straight line is d, and a wavelength of the transmission and reception signals is $\lambda$, the target detecting device calculates an azimuth of the target within the calculating azimuth angle range set by the following expression $$\theta cal = \sin^{-1}(\lambda/2d).$$

* * * * *